Feb. 16, 1954
C. JOHNSON
2,669,333
FLUID ENGAGED CLUTCH AND BRAKE
Filed July 29, 1948
3 Sheets-Sheet 1
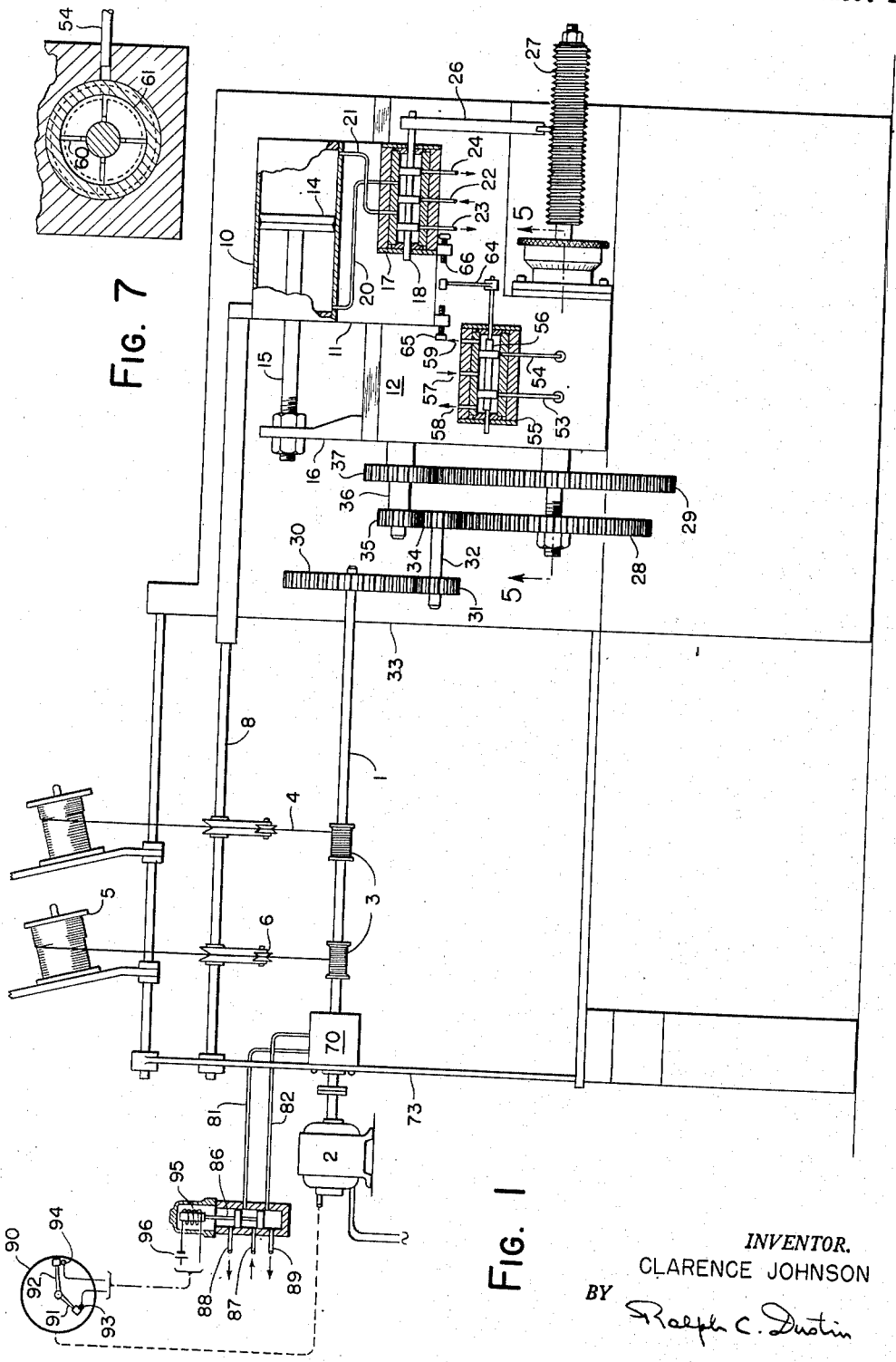
INVENTOR.
CLARENCE JOHNSON
BY
*Ralph C. Dustin*
ATTORNEY

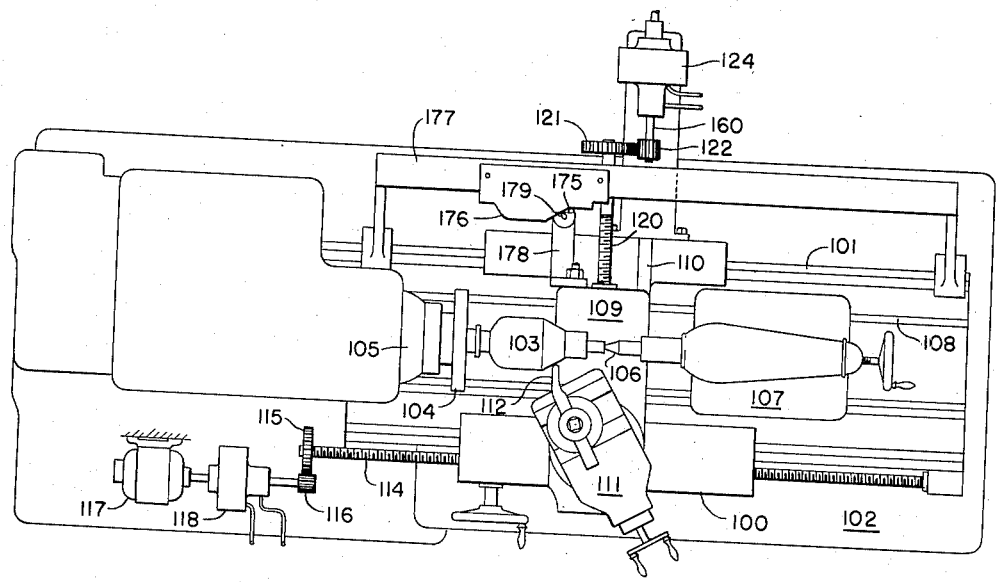

Feb. 16, 1954　　　　C. JOHNSON　　　　2,669,333
FLUID ENGAGED CLUTCH AND BRAKE
Filed July 29, 1948　　　　　　　　　　　　　3 Sheets-Sheet 3

INVENTOR.
CLARENCE JOHNSON
BY Ralph C. Dustin
ATTORNEY

Patented Feb. 16, 1954

2,669,333

UNITED STATES PATENT OFFICE 2,669,333

FLUID ENGAGED CLUTCH AND BRAKE

Clarence Johnson, Orfordville, Wis., assignor, by mesne assignments, to Rockwell Manufacturing Company, Pittsburgh, Pa., a corporation of Pennsylvania Application July 29, 1948, Serial No. 41,278

11 Claims. (Cl. 192—87)

This invention relates to clutch mechanisms, and more particularly to hydraulically actuated clutch mechanisms that are adapted to be operated for starting, stopping or reversing the drive of a driven member.

It is necessary in some machines that rotating parts, such as feed screws or spindles, be started, stopped or reversed almost instantly. In some cases it is necessary that the driven member be moved bodily as its direction of rotation is reversed, and in other cases it is necessary that there be little or no movement of the driven member produced by operation of the clutch mechanism. It is desirable that the clutch mechanism be very rugged, and that its structure be simple.

An object of my invention is to provide an improved clutch mechanism. Another object is to provide a hydraulically actuated clutch mechanism that is adapted to be operated for starting, stopping or reversing almost instantly the drive of a driven member. Still another object is to provide a clutch mechanism that is very rugged and simply constructed. Yet another object is to provide a hydraulic clutch mechanism that is well balanced and requires only a small amount of liquid to be actuated. Another object is to provide a clutch mechanism having a driven member that is adapted to be moved bodily into engagement with one or another of oppositely rotating driving members. Still another object is to provide a clutch mechanism having a driven member adapted to be moved between oppositely rotating members, and having adjustable means for varying the spacing between the driving members. Other objects will appear in the course of the following description.

This application is a continuation in part of my copending application, Serial Number 753,874, filed June 11, 1947.

In the accompanying drawings there are shown for purposes of illustration, several forms which my invention may assume in practice.

In these drawings:

Fig. 1 is a side elevational view, with parts shown in section, of a coil winding machine having different forms of my improved clutch mechanism incorporated therein.

Fig. 2 is a plan view of a machine lathe having other forms of my improved clutch mechanism incorporated therein.

Fig. 3 is a schematic diagram of the control system for the lathe of Fig. 2.

Fig. 4 is an enlarged sectional view of a tracer employed in the control system of Fig. 3.

Fig. 7 is a sectional view taken on the plane of the line 7—7 of Fig. 5.

Figure 5:
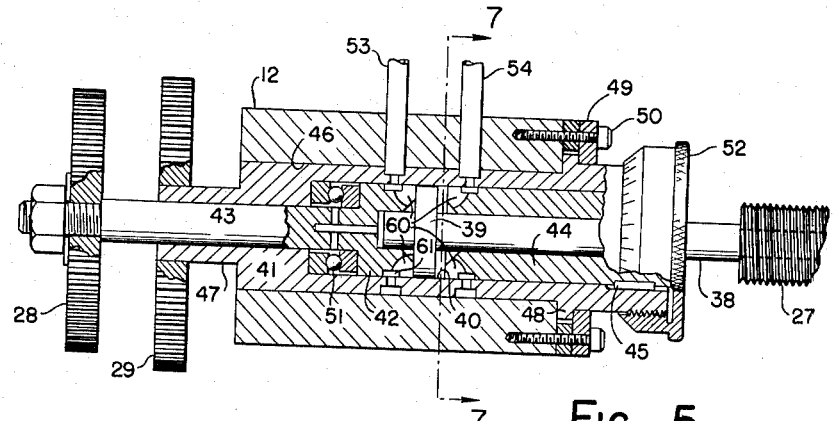
Figs. 5 and 6 are enlarged sectional views of the clutch mechanisms incorporated in the coil winding machine of Fig. 1, the view of Fig. 5 being taken on the plane of the line 5—5 of Fig. 1.

Referring to the drawings, and more particularly to Fig. 1, it will be noted that there is shown a coil winding machine including a spindle 1 driven by a motor 2 and carrying core member 3 upon which strands 4 of wire or cord are wound from spools 5. The strands 4 pass over guide members 6 carried by a member 8 which is slidably supported at its left hand end and is attached at its right hand end to a cylinder 10 carried by a carriage 11 which is slidably mounted upon a block 12. A piston 14 in the cylinder has a piston rod 15 fixed to a projecting portion 16 of the block, and a valve mechanism 17 is fixed to the carriage 11 and has a valve member 18 for controlling the connection of the opposite ends of the cylinder through conduits 20 and 21 to a liquid supply conduit 22 or to exhaust conduits 23 and 24.

When the valve member 18 is moved to the right, the liquid supply conduit is connected to the conduit 21 leading to the right hand end of the cylinder, and the left hand end of the cylinder is connected to exhaust through the conduits 20 and 24. The supply of liquid to the space between the right hand end of the cylinder and the stationary piston causes the cylinder and the carriage 11 to slide along the block 12 to the right. A movement of the valve member to the left from the position shown in Fig. 1 results in a supplying of liquid to the left hand end of the cylinder and a venting of the right hand end. The cylinder and carriage are then moved to the left along the block 12.

For positioning the valve member to cause the cylinder and carriage to travel in the desired manner on the block, there is provided an arm 26 fixed to the valve member and having a pointed end engaging threads on a member 27 which is adapted to be connected by my improved clutch mechanism of Fig. 5 in driven relation with one or another of oppositely rotating gears 28 and 29. For rotating the gears 28 and 29 in opposite directions, there is provided a pinion gear 30 on the spindle 1 meshing with a gear 31 fixed to a shaft 32 which is rotatably supported by means not shown, attached to a housing 33. A gear 34 carried by the shaft 32 meshes with the gear 28 and with a gear 35 fixed to a stub shaft 36 rotatably supported by the block 12. A gear 37 is fixed to the stub shaft and meshes with the gear 29.

As shown in Fig. 5, the member 27 is mounted on a shaft 38 carrying a piston 39 which is reciprocably received within a bore 40 of a member 41. Rotatably received within the bore at the left of the piston is a head 42 formed on a shaft 43 to which the gear 28 is connected. Received within the bore 40 at the right hand side of the piston is a sleeve shaped member 44 which is keyed at 45 to the member 41 so that it rotates with the latter but is permitted to move longitudinally relative thereto. The member 41 is rotatably received within a bore 46 formed in the block 12 and is provided with a reduced portion 47 to which the gear 29 is connected. A flange 48 on the member 41 engages the right hand side of the block 12, and an annular member 49 is connected to the block, as by screws 50, and cooperates with the flange for holding the member 41 against longitudinal movement but permitting it to rotate freely in the bore 46. Arranged in the bore 40 between the head 42 and the member 41 is a bearing 51 for preventing frictional engagement between the reversely rotating members. Formed on the head 42 and the sleeve shaped member 44 adjacent the piston are clutching or frictional surfaces adapted to be engaged selectively by frictional surfaces on the radial end faces of the piston for effecting a driving of the shaft 38 in one direction or the other. The head 42 and the sleeve shaped member are spaced apart so that a predetermined movement of the piston will be necessary in changing the driving connections. A cap 52 is threaded on the member 41 and is engageable with the sleeve shaped member for adjusting its position within the bore 40.

It is to be understood that the term "clutching" as used in this description and in the subjoined claims is used in its broad sense as meaning "gripping" and not in a narrow technical sense where it is often distinguished from "braking." In other words, "clutching" as used herein shall relate to the kinematic association between two elements, regardless of whether the object of the association is to impart or retard movement of the elements. Thus, "clutching surfaces" and "frictional surfaces" will be used synonomously and interchangeably herein to refer to engaging surfaces of both clutches and brakes.

For moving the piston into engagement with one or another of the end surfaces on the head 42 and the member 44, there are provided conduits 53 and 54 communicating through passage means in the block 12 and the member 42 with the bore 40 at opposite sides of the piston. As shown in Fig. 1, a valve mechanism 55 is connected to the block 12 and is provided with a valve member 56 for controlling the connection of the conduits 53 and 54 to a liquid supply connection 57 and to exhaust connections 58 and 59. In order that the liquid may be conducted to and from the opposite sides of the piston regardless of its position, there are provided radial grooves 60 in the faces of the head 42 and the member 44, and the conduits 53 and 54 communicate with these grooves through annular grooves 61, as shown in Figs. 5 and 7. Attached to the valve member 56 is an arm 64 engageable by adjustable abutments 65 and 66 on the carriage 11 for moving the valve member to its different positions.

To cause the carriage 11 to move to the right, the valve member 56 is positioned to the left in Fig. 1 so that liquid is supplied from the connection 57 through the conduit 53 to the left hand side of the piston 39. The right hand side of the piston is then connected to exhaust through the conduits 54 and 59. The piston is held by the liquid in engagement with the member 44 and is driven by the latter so as to rotate the member 27 in a direction to effect a travel of the arm 26 to the right. The valve member 18 moves with the arm 26 and supplies liquid to the cylinder 19 to effect a follow-up movement of the cylinder and carriage. When the abutment member 65 engages the arm 64 and moves the valve member 56 to the right, liquid is supplied to the right hand side of the piston 39 and is vented from its left hand side. The piston is then moved against the head 42 and is rotated in a direction to effect a movement of the arm 26 to the left. The valve member 18 is then positioned to supply liquid to the left hand end of the cylinder for effecting movement of the cylinder and carriage to the left. When the abutment member 66 engages the arm 64 and reverses the position of the valve member 56, liquid is supplied again to the left hand side of the piston for moving it into driven engagement with the member 44.

It will be appreciated that the strands of wire or cord must be held at some angle to the spools 3 in order to effect a winding of the strands on the spools in a smooth layer. The angle will depend on the direction in which the strands are being wound along the spool, the thickness of the strands, etc. When one layer has been wound on the spools, it is necessary that the direction in which the strands are inclined relative to the spools be changed rapidly, otherwise several turns of the strands may be piled up at the ends of the spools on each reversal. As mentioned above, the piston 39 is moved bodily from one driving member to the other when the direction of travel of the carriage 12 is reversed. The member 27 is moved with the piston and positions the valve member 18 to supply liquid to the cylinder in sufficient quantity to effect rapid movement of the cylinder at the beginning of its travel in each direction. This rapid movement provides for the shifting of the angle at which the cord is held relative to the spool so that the next layer will be started before turns can be piled up on the end of the spool. The distance traveled by the piston between the driving members may be adjusted by rotating the cap 52 to position the member 44.

Figure 6:
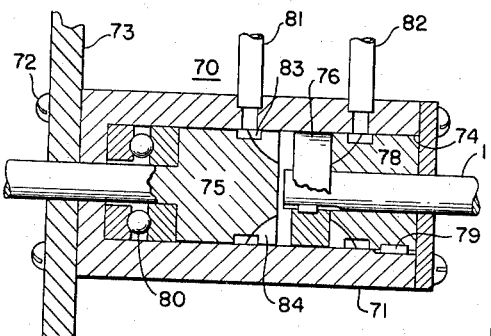

It is desirable that the driving of the spindle be discontinued and that its rotation be stopped when a predetermined number of turns have been wound on the core members 3. For controlling the connection of the spindle in driven relation with the motor 2 my improved clutch mechanism 70 shown in Fig. 6 is arranged between the motor and the spindle, as shown in Fig. 1. This mechanism includes a housing 71 fixed, as by screws 72, to a supporting plate 73 and having a bore 74 rotatably receiving an enlarged head portion 75 formed on the power shaft extending from the motor 2. A piston 76 is slidably keyed to the spindle 1 so that it may be moved into engagement with either the head portion 75 or a block 78 keyed at 79 to the housing 71. Arranged between the head 75 and the plate 73 is a bearing 80 providing a rotatable abutment for the head portion. Conduits 81 and 82 communicate with the bore 74 at opposite sides of this piston, and annular grooves 83 conduct fluid from the conduits to radial grooves 84 formed in the faces of the head portion 75 and the block 78. The conduits 81 and 82 communicate with a valve mechanism having a valve member 86 movable to positions for connecting them in communication with a liquid supply conduit 87 or with discharge conduits 88 and 89. A counter 90 is operatively connected to the motor 2 and is provided with arms 91 and 92 which are adapted to be driven at different rates about a common axis. Contacts 93 and 94 are adjustable to be engaged by the arms when the desired number of turns have been wound on the coils. A solenoid 95 controls the position of the valve member 86 and is connected in a circuit including a battery 96 and the contacts 93 and 94.

When the motor is started to drive the spindle, the arms 91 and 92 are in zero positions out of engagement with contacts 93 and 94. The valve member 86 then drops to a position connecting the liquid supply conduit 87 to the right hand side of the piston 76, and connecting the left hand side of the piston through the conduit 81 to the discharge conduit 88. The piston 76 is then moved into driving engagement with the head portion 75 for driving the spindle. As soon as the arms 91 and 92 are moved to positions engaging the conductors 93 and 94, the solenoid 95 is energized and the valve member 86 is moved to a position for supplying liquid to the left hand side of the piston and connecting its right hand side to discharge. The piston 76 is then forced into engagement with the stationary block 78 for braking the rotation of the spindle.

In Fig. 2 there is shown a machine lathe having a carriage 100 slidably mounted on guideways 101 for movement longitudinally of the lathe bed 102. A workpiece 103 is fixed at one end to a head stock 104 driven by a motor 105, and is rotatably supported at its other end by a tail stock 106 mounted on a carriage 107 which is slidably supported on suitable ways 108 for movement longitudinally of the lathe. A cross-slide 109 is mounted in ways 110 on the carriage 100 for sliding movement transversely of the lathe. A tool support 111 is adjustably mounted on the cross-slide and carries a tool 112 for performing work on the workpiece. A feed screw 114 operatively engages the carriage 100 and carries a gear 115 meshing with a pinion gear 116 driven by a motor 117 through one of my improved clutch mechanisms 118. Movement of the cross slide transversely of the lathe is effected by a feed screw 120 operatively engaging the cross slide and carrying a gear 121 meshing with a pinion gear 122 driven by power means, shortly to be described, through another form of my improved clutch mechanism 124.

Figure 8:
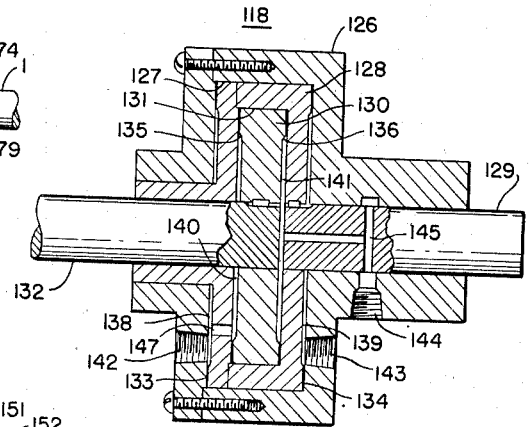
Figs. 8 and 9 are enlarged sectional views of the clutch mechanisms incorporated in the machine lathe of Fig. 2.

The clutch mechanism 118 comprises, as shown in Fig. 8, a housing 126 having a bore 127 in which a driven element 128 in the form of a casing is rotatably received. The housing is secured to the base of the lathe by any suitable means, not shown, and the driven element is slidably keyed to a shaft 129 carrying the pinion gear 116. A driving element 130 is rotatably received within a bore 131 in the driven element and is slidably keyed to the power shaft 132 of the motor 117. The driven element 128 is so proportioned that clearances of only a few thousandths of an inch are provided between its opposite ends and the end walls of the housing when centered therein, as shown at 133 and 134 in Fig. 8, and the driving element is shaped to provide clearances of only a few thousandths of an inch between its opposite ends and opposed surfaces on the driven element, as shown at 135 and 136. It has been found that the clearances at the end surfaces of the rotating elements are preferably in the order of .003'' to .007''. The end surfaces of the driven element are recessed to provide larger clearances 138 and 139 between it and the housing, and the driving element has its end surfaces recessed to provide larger clearances 140 and 141 between it and the driven element. Ports 142 and 143 open through the housing into the spaces formed by clearances 138 and 139, respectively, and a port 144 opens through the housing into communication with passage means 145 extending through the shaft 129 to the space 141.

The ports 143 and 144 are adapted to be connected by means shortly to be described, selectively in communication with a liquid supply and with exhaust. When liquid is supplied through the port 143 to the space 139, the driven element is forced into engagement with the housing at the left hand end of the bore 127 for braking the rotation of the shaft 129. A supply of liquid through the port 144 and the passage means 145 to the space 141 results in a moving of the driving and driven elements into engagement with each other at the left hand end of the bore 131 and a connection of the power shaft 132 in driving relation with the shaft 129. It will be appreciated that because of the extremely small clearances provided at the clutch and braking surfaces of the rotating elements, only a very small amount of fluid need be supplied to the spaces 139 and 141 to effect the desired engagement of these surfaces. Thus, the clutch is practically instantaneously responsive to the application of fluid pressure making possible its utilization in installations requiring extremely high speed control. The driven and the driving elements have close rotating fits in the bores 127 and 131, respectively, but sufficient liquid passes between them and the walls of the bores to provide the necessary lubrication. Liquid escaping through the bores enters the spaces 138, 140 and is drained from the housing through the port 142 so that it does not interfere with the movement of the elements into frictional engagement with each other and with the housing. A port 147 in the driven element permits liquid to drain from the space 140 to the space 138 where it escapes through the drain port 142.

Figure 9:
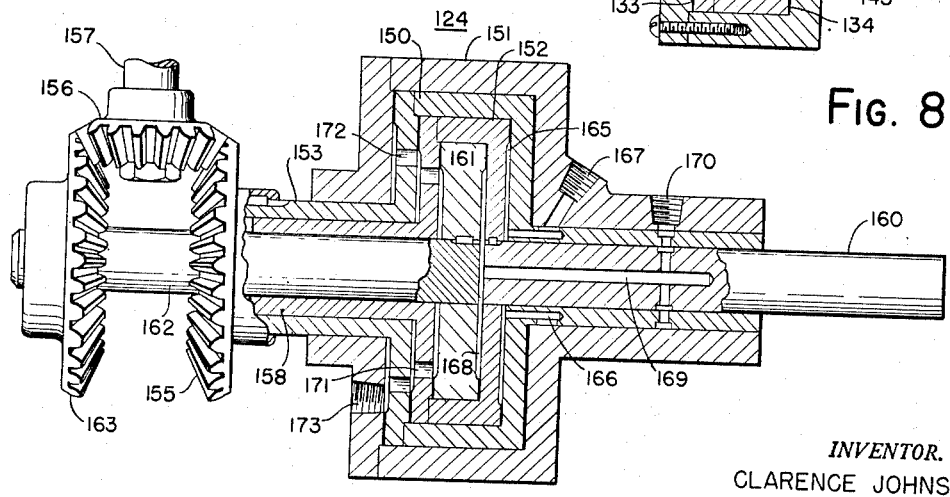

The clutch mechanism 124, as shown in Fig. 9, is like the clutch mechanism 118 except that a driving element 150 is rotatably received within the space between the housing 151 and the driven element 152. The driving element 150 is provided with a tubular shaft 153 extending through an opening in the housing and carrying a beveled gear 155 meshing with a beveled gear 156 attached to a power shaft 157. The driven element 152 has a reduced sleeve portion 158 at one end extending through the tubular shaft 153 and is slidably keyed at its other end to a shaft 160 carrying the pinion gear 122, as shown in Fig. 2. A driving element 161 is slidably keyed to a shaft 162 extending through the sleeve portion 158 and carrying a beveled gear 163 meshing with the driving gear 156. The driving elements and the driven element are so proportioned that they have close rotating fits at their peripheries and provide clearances of only a few thousandths of an inch between their end surfaces. The driven element is recessed at its right hand end to provide a space 165 which may be connected to a liquid supply or to exhaust through passage means 166 and a port 167 in the housing. The driving element 161 is recessed at its right hand side to provide a space 168, and liquid may be supplied to or discharged from this space through a passage 169 in the shaft 160, and a port 170 in the housing. The left hand ends of the driving and driven elements are recessed to provide spaces for receiving liquid escaping between the peripheries of the elements, and ports 171 and 172 drain the liquid from these spaces to a port 173 in the casing.

It will be appreciated that the driving elements 150 and 161 are rotated in opposite directions by reason of their connections through the gears 155 and 163 to the driving gear 156. When liquid is supplied under pressure to the space 165, the driving element 150 and the driven element 152 are forced in opposite directions until they engage each other at their left hand ends and are held for rotation together. A supply of liquid to the space 168 effects frictional engagement between the driven element and the driving element 161 at their left hand ends for rotating the shaft 160 in the opposite direction.

For controlling the supply and discharge of liquid relative to my improved clutch mechanisms, there is provided, as shown in Fig. 2, a tracer 175 cooperating with a templet 176 and connected in a control system, as shown in Fig. 3. The templet is mounted on a stationary member 177 fixed to the base of the lathe and is provided with a guide surface conforming to the desired shape of the work piece. The tracer is supported by a bracket 178 attached to the cross-slide 109 and includes a tracer arm 179 engageable with the guide surface on the templet. The tracer arm, as shown in Fig. 4, is supported by a hub portion 180 on a circular plate 181 which rests upon a pivot point 182 carried by the bracket 178. An annular plate 183 surrounds the hub portion and rests upon the knife edge of a flange 184 joined on the plate 181 at its periphery. A spring arm 185 is fixed to the bracket 178 and acts upon the plate 183 for holding the latter normally in engagement with the flange 184. A yoke 187 is carried by the plate 183 and has a contactor 188 attached thereto for engagement with contacts 189 and 190 adjustably supported by the bracket 178. A leaf spring 191 is connected between the bracket and the yoke so that parallel motion of the latter is obtained when the plate 183 is raised or lowered.

When the plate 183 engages the flange 184 over its full circumference, as shown in Fig. 4, the contactor 188 engages the lower contact 190. As the tracer arm 179 is moved against the templet to cause a tilting of the plate 181 about the pivot point 182, the plate 183 is raised and, by reason of the spring arms 185 and 191, is always held in horizontal positions. The yoke 187 is moved upwardly in a vertical position as the plate 183 is raised, and the contactor 188 is moved out of engagement with the contact 190. If the tracer arm is tilted sufficiently, the contactor 188 will be moved into engagement with the contact 189.

As shown in Fig. 3, a valve mechanism 192 is provided with a valve member 193 for controlling the connection of a liquid supply conduit 194 and exhaust conduits 195 and 196 in communication with conduits 197 and 198 leading to the ports 143 and 144, respectively, in the clutch housing 126. A spring 200 acts on the valve member for holding the latter normally in a position to supply liquid from the conduit 194 through the conduit 198 to the port 144. A solenoid 201 has its plunger connected to the valve member 193 and is operative when energized to move the latter against the action of the spring 200 to a position for connecting the supply conduit 194 to the conduit 197, and connecting the conduit 198 to the exhaust conduit 196.

The supply of liquid to the clutch mechanism 124 is controlled by a valve mechanism, generally designated 205. This valve mechanism includes a valve member 206 for controlling the connection of a liquid supply conduit 207 and exhaust conduits 208 and 209 with conduits 210 and 211 communicating with the ports 167 and 170 in the clutch housing 151. Springs 212 normally hold the valve member in a position to cut off communication between the conduits 210, 211 and the supply conduit 207 and to connect them to the exhaust conduits 208 and 209. Solenoids 214 and 215 have plungers connected to the valve member and are operative when energized to move the latter against the action of the springs 212.

A conductor 218 of a power line is connected to one end of the solenoid 201, and the other end of this solenoid is connected by a conductor 219 to the contactor 188. The contacts 189 and 190 are connected, respectively, through conductors 220, 221 and the solenoids 214, 215 to the other conductor 222 of the power line.

When the tracer arm 179 is free of the templet, the plates 181 and 183 engage each other as shown in Fig. 4 and the contactor 188 engages the contact 190. A circuit is then completed from the power conductor 218 through the solenoid 201, the conductor 219, the contactor 188, the contact 190, the conductor 221 and the solenoid 215 to the power conductor 222. Energizing of the solenoid 201 effects movement of the valve member 193 to a position for supplying liquid from the conduit 194 through the conduit 197 to the space 139 between the clutch housing 126 and the driven element 128. The space 141 is connected at the same time through the passage means 145 and the conduit 198 to the exhaust conduit 196. The liquid in the space 139 acts to move the driven element into engagement with the housing at its left hand end for holding the feed screw 114 against rotation. With the solenoid 215 energized, the valve member 206 is held in a position for supplying liquid from the conduit 207 through the conduit 210 to the space 165 between the driven element 152 and the driving element 150. Communication between the conduit 210 and the exhaust conduit 208 is then cut off, but the conduit 211 continues to communicate with the exhaust conduit 209 for venting liquid from the space 168. The liquid acts in the space 165 to force the driven element into engagement with the driving element 150 at its left hand end for effecting a rotation of the shaft 160 and the gear 122. The gear 121 is then driven by the gear 122 and rotates the feed screw 120 in a direction to move the cross-slide 109 along the guideways 110 toward the templet.

As soon as the tracer arm engages the templet and is tilted to lift the plate 183 to a point where the contactor is moved out of engagement with the contact 190, the circuit through the solenoids 201 and 215 is broken. The valve member 193 is then moved by the spring 200 to a position for supplying liquid through the conduit 198 and the passage means 145 to the space 141 where it acts to move the driving and driven elements apart until they engage at their left hand ends and connect the shaft 129 in driven relation with the power shaft 132. The pinion gear 116 is then rotated to drive the feed screw in a direction for moving the carriage 100 to the left along the guideways 101. The valve member 206 is centered by the springs 212 for cutting off the flow of liquid from the conduit 207 and venting the conduits 210, 211 through the conduits 208 and 209. The driven element 152 is then free of the driving elements 150, 161, and the feed screw 120 stops rotating so that the cross-slide 109 moves only to the left with the carriage 100.

If the tracer arm is moved into engagement with the templet until it is tilted to a point where the contactor 188 is moved into engagement with the contact 189, a circuit is then completed from the power conductor 218 through the solenoid 201, the conductor 219, the contactor 188, the contact 189, the conductor 220 and the solenoid 214 to the power conductor 222. The energizing of the solenoid 201 again effects movement of the valve member 193 to a position for supplying liquid through the conduit 197 to a space 139 where it moves the driven element 128 into engagement with the housing for braking the rotation of the feed screw 114. The solenoid 214 moves the valve member 206 to a position for supplying liquid through the conduit 211 and the passage 169 to the space 168 for moving the driven element 161 and effecting a rotation of the feed screw 120 in a direction to move the cross-slide 109 away from the templet until the tracer arm moves to a position for breaking the contact between the contactor 188 and the contact 189.

It will be seen that a stepped positioning of the cutting tool 112 will be obtained to shape the work piece 103 to the contour of the templet. When a circuit is completed through one or the other of the solenoids 214 and 215, it is also completed through the solenoid 201. The feed screw 114 is then held against rotation, and the feed screw 120 is rotated in one direction or the other depending on which of the solenoids 214, 215 is energized. The cutting tool is then moved transversely on the lathe with the cross-slide until the tracer operates to open the circuit. As soon as the circuit is opened, the feed screw 120 is stopped and the feed screw 114 is rotated to move the carriage 100 to the left along the guideways 101. The cross-slide 109 and the tool move with the carriage parallel to the axis of the work piece 103. The clutch mechanisms 118 and 124 operate almost instantly to change the driving connections for the feed screws 114 and 120 since an extremely small quantity of fluid, which may be supplied in a very short increment of time, will move the clutch elements into and out of engagement. The contacts 189 and 190 may be adjusted so that only a slight movement of the contactor 188 is required to change its connection from one to the other. It will be appreciated that the clutch mechanisms of Figs. 5 and 6 may be used in the place of the clutch mechanisms 124 and 118, if desired, for controlling the operation of the lathe. It will be apparent from the foregoing description that the present invention provides a clutch mechanism which lends itself to practically instantaneous control. In addition it will be noted that the slip torque of each of the clutches is amenable to precise control. Because of the metal-to-metal contact of the hardened steel clutch surfaces the coefficient of friction of the surfaces remains substantially constant throughout the life of the clutch. Thus the single variable upon which the slip torque of the clutches depends is the fluid pressure. This pressure may readily be controlled by any suitable valving arrangement to provide any desired slip torque depending upon the requirements of the particular installation in which the clutches are employed.

While there are disclosed in this application several forms which my invention may assume in practice, it will be understood that it may be modified and embodied in various other forms without departing from its spirit or the scope of the appended claims.

What I claim as new, and desire to secure by Letters Patent of the United States, is:

1. A clutch mechanism comprising a housing, a driving and a driven element mounted within said housing for axial movement with respect to each other and having opposed end faces spaced from each other and providing first and second frictional surfaces engageable with each other and a fluid chamber therebetween; a power shaft connected to said driving element for rotating the latter; a shaft mounting said driven element for conjoint rotation therewith; means within said housing providing a third frictional surface; conduit means for selectively subjecting at least one of said elements to a source of fluid pressure for effecting relative axial movement of said elements to engage said first and second frictional surfaces; a fourth frictional surface within said housing, located on said driven element; and conduit means for selectively subjecting at least said one of said elements to a source of fluid pressure for effecting opposite relative movement of said elements with respect to each other to disrupt the driving engagement effected by said first mentioned conduit means and effecting engagement of said third frictional surface with said fourth frictional surface.

2. The clutch mechanism according to claim 1 wherein said third frictional surface is stationary with respect to said driving and driven elements and operation of said second mentioned conduit means results in braking the rotation of said driven element.

3. The clutch mechanism according to claim 1, including a second driving element within said housing and carrying said third frictional surface, a second power shaft connected to said second driving element for rotating the latter oppositely with respect to said first driving element whereby operation of said second mentioned conduit means to engage said third and fourth frictional surfaces results in reversal of the direction of rotation of said driven element.

4. A clutch mechanism comprising a housing; a driving and a driven element mounted within said housing for axial movement with respect to each other and having opposed end faces spaced from each other and providing clutching surfaces engageable with each other and a fluid chamber therebetween; a power shaft connected to said driving element for rotating the latter; a shaft mounting and connected to said driven element for rotation therewith; conduit means for selectively subjecting at least one of said elements to a source of fluid pressure for effecting relative axial movement of said elements to engage said clutching surfaces; and conduit means for selectively subjecting at least said one element to a source of fluid pressure for effecting opposite relative movement of said element with respect to each other to disrupt the driving engagement effected by said first mentioned conduit means; a second driving element mounted within said housing; a second power shaft connected to said second driving element for rotating the latter oppositely with respect to said first mentioned driving element; said driven element and said second driving element having cooperating clutching faces adapted for engagement upon selective operation of said second mentioned conduit means to impart reverse rotation to said driven element.

5. A clutch mechanism comprising a driving and a driven element mounted for axial movement with respect to each other and nested one within the other and having two pairs of opposing end faces defining respective fluid chambers therebetween and frictional surfaces on one pair of said opposing end faces adapted to engage with each other; a third element receiving the outer of said nested elements in nested relation therein and having internal end faces opposing the external end faces of said outer nested element and defining therewith additional respective fluid chambers and additional frictional surfaces on one pair of said opposing internal and external end faces adapted to engage with each other; said frictional surfaces and additional frictional surfaces being located at one end of said clutch mechanism; conduit means individual to the respective fluid chambers at the other end of said clutch mechanism for selectively subjecting said elements to a source of fluid under pressure for effecting relative axial movement of said elements alternately to engage said frictional surfaces or said additional frictional surfaces; conduit means common to the fluid chambers at said one end of said clutch mechanism for draining any fluid reaching said chambers therefrom; a power shaft connected to said driving element for rotating said element; and a power take-off shaft connected with said driven element.

6. The clutch mechanism defined in claim 5 including a second separate power shaft connected to said third element for rotating the latter oppositely with respect to said driving element to impart reverse rotation to said driven element when said additional frictional surfaces are engaged.

7. The clutch mechanism defined in claim 5 wherein said third element is a housing member stationary with respect to said driving and driven elements imparting braking influence to the rotation of the latter when said additional frictional surfaces are engaged.

8. A clutch mechanism according to claim 1 wherein the frictional surfaces on said driven element comprise opposite axially spaced radially extending faces, said driving member is positioned between said faces and said fluid under pressure is applied to one of said faces and reacts against the driving element to engage the other of said faces in clutching engagement with said driving member with a force which counterbalances said fluid pressure.

9. A clutch mechanism according to claim 1 wherein said driven element is fixed against axial movement relative to its respective shaft and the axial movements of said driven element are thereby transmitted to said shaft together with power take-off means on said shaft adapted to be shifted from one operative position to another upon axial movement of said shaft.

10. A clutch mechanism according to claim 1 including thrust bearing means rotatably supporting said driving element.

11. A clutch mechanism according to claim 1 wherein the frictional surface of one of said elements is provided with radially extending grooves communicating with said source of fluid under pressure to provide lubrication between said clutching surface and the mating clutching surface of the other element during slippage therebetween.

CLARENCE JOHNSON.

References Cited in the file of this patent

UNITED STATES PATENTS

| Number | Name | Date |
| --- | --- | --- |
| 1,135,525 | Hibbard | Apr. 13, 1915 |
| 1,138,099 | Fornaca | May 4, 1915 |
| 2,002,367 | Fahrney | May 21, 1935 |
| 2,135,576 | Hazard | Nov. 8, 1938 |
| 2,161,702 | Durig | June 6, 1939 |
| 2,170,538 | Sarver | Aug. 22, 1939 |
| 2,298,645 | Jackes | Oct. 13, 1942 |
| 2,352,140 | Trott | June 20, 1944 |
| 2,398,806 | Schneider | Apr. 23, 1946 |
| 2,399,853 | Chilton | May 7, 1946 |
| 2,483,521 | Blanchette | Oct. 4, 1949 |
| 2,489,258 | Bebinger et al. | Nov. 29, 1949 |

FOREIGN PATENTS

| Number | Country | Date |
| --- | --- | --- |
| 18,022A | Great Britain | Sept. 6, 1905 |